United States Patent [19]

Redondo et al.

[11] Patent Number: 5,437,930
[45] Date of Patent: Aug. 1, 1995

[54] CABLE FOR HIGH OPERATING TEMPERATURES

[75] Inventors: Eduardo G. Redondo, Monza; Luca Castellani; Antonio Zaopo, both of Milan, all of Italy

[73] Assignee: Pirelli Cavi S.p.A., Milan, Italy

[21] Appl. No.: 48,768

[22] Filed: Apr. 16, 1993

[30] Foreign Application Priority Data

May 8, 1992 [IT] Italy .............................. MI92A1113

[51] Int. Cl.⁶ ........................................... B32B 27/06
[52] U.S. Cl. .................................... 428/419; 428/447; 428/473.5; 525/474; 525/537
[58] Field of Search ................. 428/419, 447, 473.5; 525/474, 537

[56] References Cited

FOREIGN PATENT DOCUMENTS

| | | |
|---|---|---|
| 0377080 | 9/1989 | European Pat. Off. . |
| 0410621 | 1/1991 | European Pat. Off. . |
| 4024595 | 2/1991 | Germany . |
| 2193216 | 6/1987 | United Kingdom . |

*Primary Examiner*—P. C. Sluby
*Attorney, Agent, or Firm*—Brooks Haidt Haffner & Delahunty

[57] ABSTRACT

In a cable in accordance with the invention, capable of working at operating temperatures of 150° C., a conductor coating made of a mixture of a polyphenylsulfide and a silicone ether imide block copolymer is provided. The invention also refers to the mixture in itself and to a method of producing said cable.

5 Claims, 2 Drawing Sheets

CABLE FOR HIGH OPERATING TEMPERATURES

DESCRIPTION

The present invention relates to an electric and/or optical cable, of the flame-propagation resistant type, emitting non-corrosive low-toxicity gases and fumes in the presence of a fire, provided with high resistance to thermopressure and designed to work at high operating temperatures, in particular at temperatures even as high as 150° C.

The invention also relates to materials adapted to produce the above cables and a method of making said cables.

Presently polymers used to make electric and/or optical cables which are flame-propagation resistant and at the same time capable of withstanding an operating temperature of 150° C. are ethylenetetrafluoroethylene copolymers. The presence of fluorine in these polymers involves that in the presence of a fire, an emission of hydrogen fluoride occurs, which is a very corrosive and toxic acid. Standard MIL W 22759/18A relating to control and monitoring cables for military and paramilitary applications that must be fire-propagation resistant and withstand operating temperatures as high as 150° C., prescribes the use of said fluorinated polymers, accepting the fact that in the presence of a fire corrosive gases may be formed, in particular when electronic and highly toxic components are concerned.

Therefore this standard excludes the use of polymers and mixtures thereof having the mechanical features adapted to form conductor and cable coatings that simultaneously meet the requirements of:

being fire-propagation resistant,
evolving low-toxicity, non-corrosive gases, devoid of halogens in the presence of a fire,
being highly thermopressure-resistant,
enabling electric conductors and cables to work at operating temperatures as high as 150° C.

Known polymeric materials devoid of halogens and other chemical elements capable of giving rise to the formation of corrosive fumes and gases and having a low degree of toxicity in the presence of a fire, which have in themselves a resistance to flame propagation comparable to that of halogenated polymers, are polyphenylsulfides (PSF) and silicone ether imide block copolymers (CSEI).

By polyphenylsulfide (PFS) it is intended a polymer either of the straight or branched type, described for example in U.S. Pat. No. 3,919,177, which is deemed to be better represented as a monomer chain corresponding to the formula:

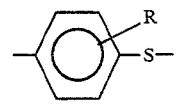

wherein R is selected from a hydrogen atom and at least one phenylsulfide radical.

Examples of polyphenylsulfides are those available from Bayer under the trade name TEDUR, or from Philips under the trade name RYTON.

A polyphenylsulfide alone is not appropriate to make coatings for conductors and/or cables designed to operate even occasionally at temperatures higher than 125° C., due to its mechanical features.

In fact a conductor and/or cable coating made of polyphenylsulfide, after staying even for a short period of time at temperatures higher than 125° C., exhibits an ultimate elongation of 10% which makes it unacceptable due to the fact that, as known in the cable field, a conductor and/or cable coating must have an ultimate elongation not lower than 50% and preferably an ultimate elongation at least of 100% in order to enable cables to have an appropriate flexibility.

The low value of the ultimate elongation (10%) of a polyphenylsulfide coating for conductors and/or cables depends upon the fact that 125° C. represent the recrystallization temperature of a polyphenylsulfide. In fact a crystalline polyphenylsulfide has low values as regards ultimate elongation.

By silicone ether imide block copolymers (CSEI) it is intended a polymer such as for example the one described in patent W087/00846, which is deemed to be better represented by the formula:

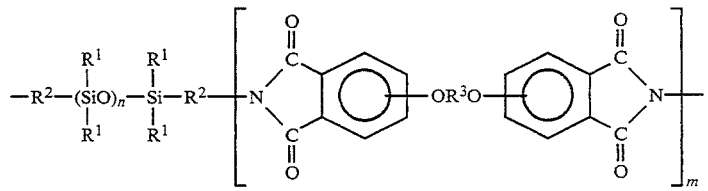

wherein:
R2 is selected from alkyl groups having 1 to 14 carbon atoms and preferably is a propyl group,
R1 is selected from alkyl groups having 1 to 14 carbon atoms and preferably is a methyl group,
R3 is a bivalent aromatic group having 6 to 20 carbon atoms and preferably is a bisphenol A group,
n and m are numbers between 4 and 10 and 1 and 3, respectively.

One example of the copolymer in question is that available from General Electric under the trade name SILTEM STM-1500.

Silicone ether imide block copolymers exhibit an ultimate elongation value higher than 100%, which makes them appropriate for producing conductor and/or cable coatings.

However, since silicone ether imide block copolymers have a weak resistance to thermopressure measured according to standards CEI 20-34, they do not allow cables to be manufactured which are capable of working at operating temperatures as high as 150° C. according to standard MIL W 22759/18A requiring that a holding-up test at a temperature of 230° C. for 7 hours should be passed.

Since coatings for conductors and/or cables made using the above mentioned individual two polymers have a weak resistance to thermopressure, as will be described in the following, the expert in the art has no reason to think that mixtures of said polymers, that is polyphenylsulfide (PFS) and silicone ether imide block copolymers (CSEI), even if they should be perfectly miscible, can reach thermopressure-resisting temperatures high enough to enable a cable coated with them to work at operating temperatures of 150° C. and therefore pass tests established by standards MIL W 22759/18A.

The applicant has instead found that it is possible to make flame-propagation resistant cables which at the same time are capable of working at an operating temperature higher than the temperature corresponding to the weighed average of the operating temperatures of the component polymers depending upon the mixture composition, and in particular working temperatures of 150° C., which polymers in the presence of a fire evolve low-toxicity non-corrosive gases using blends containing mixtures of a polyphenylsulfide (PFS) and a silicone ether imide block copolymer (CSEI), both as hereinafter defined, due to a synergistic effect leading to an improvement in properties not only in connection with tensile stress and ultimate elongation, but above all in connection with resistance to thermopressure occurring in the mixture of said polymers.

A condition enabling the obtention of cables capable of withstanding operating temperatures higher than those calculated as a weighed average, depending on composition, of the component polymers, is that both straight and branched polyphenylsulfides (PFS) should have a viscosity greater than 110 Pa per second with $\gamma. = 1000\ s^{-1}$ measured at 310° C. by a capillary rheometer 30 mm long and having a hole of 1 mm, and that said polyphenylsulfide should be present in an amount included between 15 and 90 parts by weight, preferably between 25 and 70 parts by weight and more preferably, should the operating temperature be 150° C., between 50 and 65 parts by weight per 100 parts by weight of the mixture.

The present invention in one aspect relates to a cable comprising a conductor and at least a coating layer extruded on said conductor, characterized in that said coating comprises a mixture of polyphenylsulfide and a silicone ether imide block copolymer in which polyphenylsulfide has a viscosity greater than or equal to 110 Pa per second at 310° C. and is in an amount included between 15 and 90 parts by weight per 100 parts by weight of the mixture.

The present invention in a second aspect relates to a material for forming conductor and/or cable coatings consisting of a polymeric material blend characterized in that said blend comprises a mixture of a polyphenylsulfide and a silicone ether imide block copolymer in which polyphenylsulfide has a viscosity greater than or equal to 110 Pa per second at 310° C. and is in an amount included between 15 and 90 parts by weight per 100 parts by weight of the mixture.

The present invention in a third aspect relates to a method of making cables comprising the step of extruding at least one coating layer of a polymeric material blend on the conductor, characterized in that said blend comprises a mixture of polyphenylsulfide and a silicone ether imide block copolymer in which polyphenylsulfide has a viscosity greater than or equal to 110 Pa per second at 310° C. and is in an amount included between 15 and 90 parts by weight per 100 parts by weight of the mixture.

The present invention will best be understood from the following detailed description given by way of non-limiting example with reference to the accompanying drawings, in which.

Figure 1:
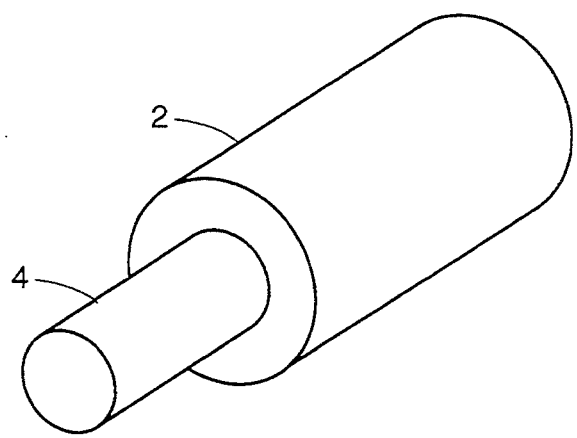
FIG. 1 is a perspective view of a cable length in accordance with the invention.

A cable in accordance with the invention, in the particular embodiment shown in FIG. 1, exhibits an electric or optical conductor 1 surrounded by at least a coating layer 2 made of the material of the invention as hereinafter described.

If conductor 1 is an optical conductor, it may for example consist of a single optical fiber, a bundle of optical fibers and generally any optical core into which optical fibers are housed.

If conductor 1 is an electric conductor, it may be for example, when to be used as miniaturized cable for low-voltage (voltage lower than or equal to 1 KV) signallings and controls, a cord of electrically conductive material such as copper or aluminum, for example a cord of 0.5 mm² in section formed with 19 strands made of tinned copper, and the coating layer 2 adhering to the cord is 0.2 mm thick and is formed by extrusion around said cord.

A material in accordance with the invention to form the coating 2 consists of a blend comprised or preferably consisting of a mixture of a polyphenylsulfide (PFS) as hereinafter defined and a silicone ether imide block copolymer (CSEI) as hereinafter defined.

Polyphenylsulfide (PFS) may be of the straight or branched type and (as previously said) to the ends of the present invention it must have a molecular weight to which a viscosity greater than 110 Pa per second with $\gamma. = 1000\ s^{-1}$ measured at 310° C. by a capillary rheometer 30 mm long and having a hole of 1 mm, corresponds.

Silicone ether-imide block copolymer is the one previously defined and it is the only one presently available on the market.

Different mixtures of both straight and branched polyphenylsulfides (PFS) available on the market and having different viscosities have been made with the only silicone ether imide block copolymer (CSEI) presently available.

One mixture group has been made with a polyphenylsulfide (PFS) of the branched type having a viscosity greater than 110 Pa per second at 310° C., in particular a viscosity of 200 Pa per second at 310° C., which has been mixed according to different ratios with the silicone ether imide block copolymer (CSEI) in a Brabender mixer. Mixing has been carried out at a temperature of 300° C. over a period of 10 minutes.

A second mixture group has been made with a straight polyphenylsulfide (PFS) having the same viscosity as above and mixed with the silicone ether imide block copolymer (CSEI) according to the same ratios and following the same modalities as those of the first mixture group.

Using mixtures of the first and second groups 200×200×1 mm plates have been made by moulding.

Test pieces have been made out of said plates by die cutting and tensile stress (CR) and ultimate elongation (AR) properties in accordance with standards CEI 20-34 have been determined on said test pieces, at a pulling rate of 50 mm per second. Said mechanical properties have been measured in the absence of heat treatments susceptible of causing a recrystallization of the material.

In addition glass transition temperature (Tg) values have been determined using a dynamic thermomechanical analyzer DMTA MK-II to 1 Hz frequency.

Data obtained for mixtures of the first and second groups is shown in Tables 1 and 2, respectively.

TABLE 1

| Branched PFS w % | CSEI w % | CR MPa | AR % | Tg °C. |
| --- | --- | --- | --- | --- |
| 0 | 100 | 24 | 89.0 | 165 |
| 25 | 75 | 27 | 31.6 | 172 |
| 50 | 50 | 41 | 12.6 | 122 |
| 75 | 25 | 60 | 10.6 | 119 |
| 100 | 0 | 71 | 3.0 | 118 |

TABLE 2

| Straight PFS w % | CSEI w % | CR MPa | AR % | Tg S° C. |
| --- | --- | --- | --- | --- |
| 0 | 100 | 24 | 89 | 165 |
| 25 | 75 | 26 | 30 | 165 |
| 50 | 50 | 42 | 15 | 120 |
| 75 | 25 | 60 | 10 | 120 |
| 100 | 0 | 50 | 2.5 | 115 |

From the results shown in Tables 1 and 2 it is pointed out that:
the fact that in the above mixtures the polyphenylsulfide (PFS) used is straight or branched does not affect the results,
the two component polymers are quite miscible in that for any mixture composition there is one and the same glass transition temperature.

Although the low ultimate elongation (AR) values shown in Tables 1 and 2 advise against the use, in the cable field, of polyphenylsulfide and silicone ether imide block copolymer mixtures as above made, cables have been manufactured in which mixtures containing different ratios of the same two polymers employed to form the above plates have been applied by extrusion to a cord of tinned copper such as the one previously defined.

Said mixtures have been made using a continuous mixer Buss Co-Kneader type KKG 4.6-7 and carrying out the mixing at a temperature of 290° C. over a period of 1 minute.

For coating the above defined cord an extruder for man-made polymers having a diameter of 30 mm and being 24 diameter long has been used which operates at the melted product temperature of 290° C.

The necessary test pieces for experimental tests have been obtained by taking the cords out of the coating.

The tensile stress (CR) and ultimate elongation (AR) values have been established on said test pieces consisting of samples of the cable coating, following standards CEI 10-34, at a pulling rate of 50 mm per minute.

Tensile stress (CR) and ultimate elongation (AR) values still based on said standard have been also determined on conditioned test pieces, that is test pieces submitted to a heat treatment, in particular submitted to a temperature of 150° C. for 4 hours.

In addition, based on said standard, tensile stress and ultimate elongation values of cord coatings formed with the individual polymers constituting said mixtures have been also determined, following the above modalities.

Also tests concerning resistance to thermopressure in accordance with standard CEI 20-34 have been carried out both on cords coated with unconditioned mixtures, and cords the coating of which is formed with the individual polymers constituting said mixtures.

The results of the experimental tests carried out on the different cord coatings are shown in Table 3, in which:
CR stands for the tensile stress expressed as MPa of the test pieces not submitted to heat treatment
CRT stands for the tensile stress expressed as MPa of the test pieces submitted to the above heat treatment
AR stands for the ultimate elongation of the test pieces not submitted to heat treatment
ART stands for the ultimate elongation of the test pieces submitted to heat treatment
TRM stands for the resistance to thermocompressive stress expressed as ° C. of the test pieces not submitted to heat treatment,
PFS means polyphenylsulfide
CSEI means silicone ether imide block copolymer.

TABLE 3

| PSF w % | CSEI w % | CR | CRT | AR | ART | TRM |
| --- | --- | --- | --- | --- | --- | --- |
| 0 | 100 | 20 | 21 | 135 | 130 | 142 |
| 25 | 75 | 37 | 34 | 200 | 185 | 146 |
| 50 | 50 | 39 | 41 | 255 | 220 | 191 |
| 60 | 40 | 44 | 46 | 265 | 190 | 224 |
| 75 | 25 | 42 | 43 | 265 | 130 | 180 |
| 100 | 0 | 37 | 39 | 265 | 2.0 | 146 |

Figure 2:
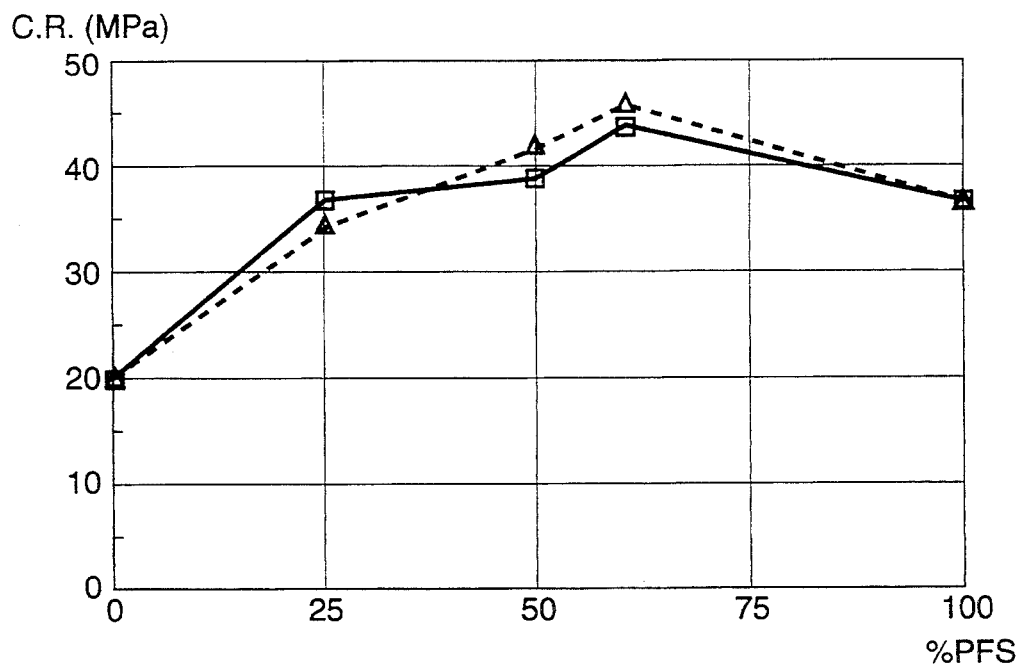
FIG. 2 is a diagram showing the tensile stresses in MPa of conductor and/or cable coatings consisting of mixtures of polyphenylsulfides and silicone ether imide block copolymers, depending upon the mixture composition.
Figure 3:
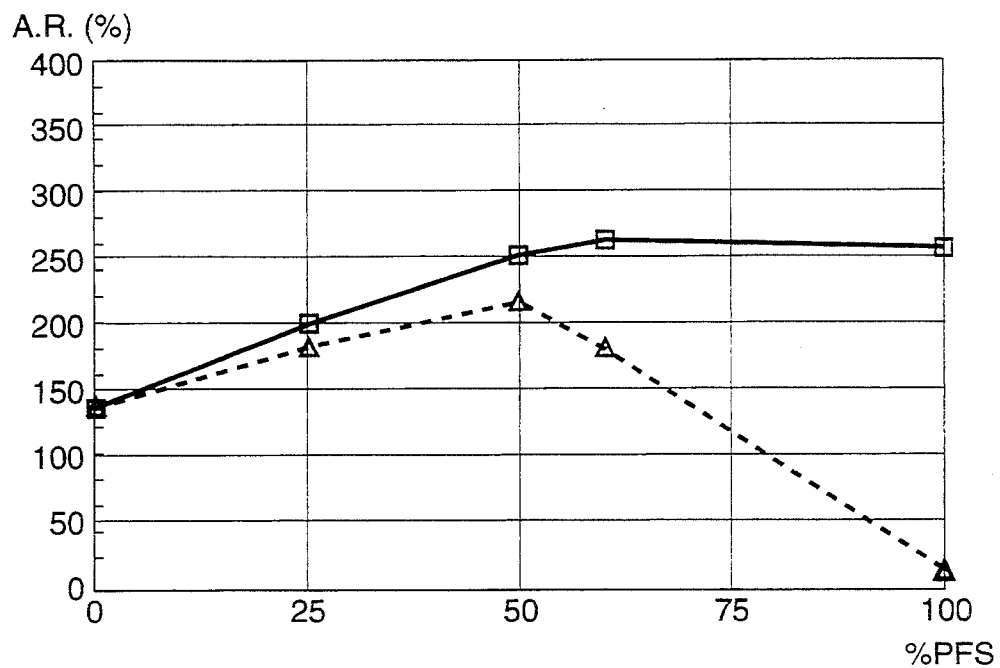
FIG. 3 is a diagram showing the ultimate elongations of conductor and/or cable coatings consisting of mixtures of polyphenylsulfide and silicone ether imide block copolymers, depending upon the mixture composition.
Figure 4:
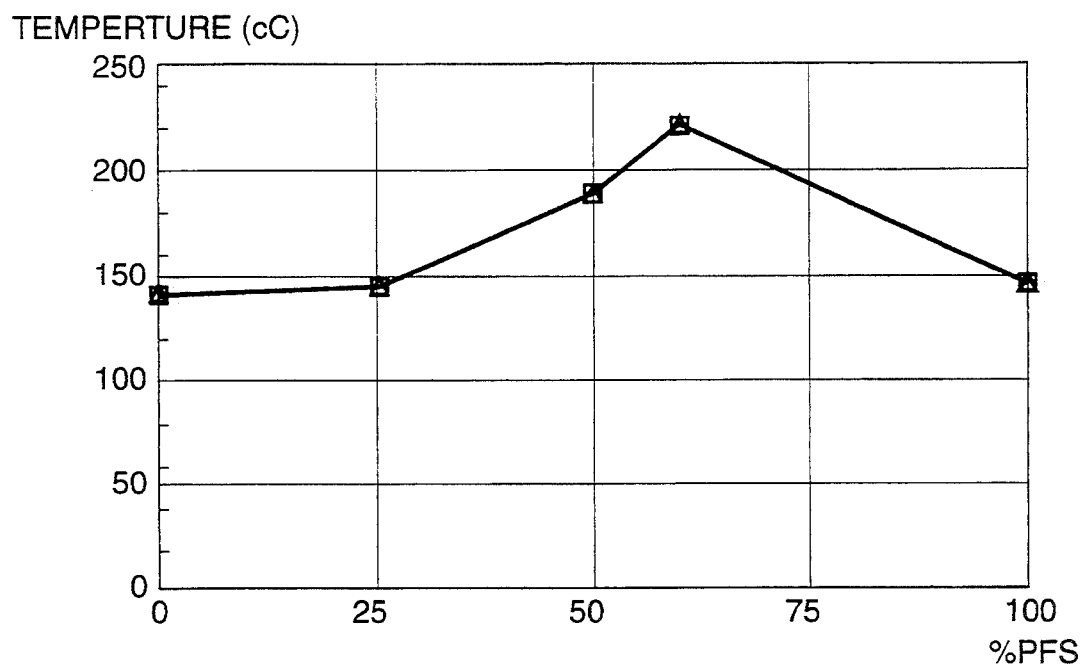
FIG. 4 is a diagram showing the resistance to thermocompressive stress of conductor and/or cable coatings consisting of mixtures of polyphenylsulfide and silicone ether imide block copolymers, depending upon the mixture composition.

In FIGS. 2, 3 and 4 the diagrams obtained on the basis of values reproduced in Table 3 are shown, in which the percent of polyphenysulfide in the mixture is reproduced on the abscissa whereas on the ordinates the following values are respectively reproduced:
in FIG. 2 the tensile stress of mixtures expressed as MPa
in FIG. 3 the ultimate elongation of mixtures
in FIG. 4 the resistance to thermocompressive stress and more particularly the temperature expressed as ° C. at which the reduction of 50% in the coating thickness of a cable occurs.

In FIG. 2 two lines are drawn, namely a continuous line representing the development of the tensile stress values for unconditioned coatings, that is not submitted to the previously mentioned heat treatment and a dotted line representing the development of the tensile stress values for conditioned coatings.

The examination of FIG. 2 shows above all that the tensile stress values are not only additive as would be predictable from the compatibility of the two polymers, taking into account the existence of a single value of glass transition temperature, but they highlight the existence of a synergistic effect in the mixture in connection with the tensile stress.

From FIG. 2 it is also possible to see that, since the tensile stress of a cable coating must be higher than 30 MPa, as is known to an expert in the art, there is a restriction in the amount of polyphenylsulfide present in the mixture. In particular, in the field of cables it is necessary to reject mixtures in which the amount of the polyphenylsulfide content is lower than 15%.

Two lines are also present in FIG. 3, namely a continuous line showing the development of the ultimate elongation for unconditioned coatings and a dotted line showing the development of the ultimate elongation for conditioned coatings.

In FIG. 3 as well it is possible to notice the existence of an unpredictable synergistic effect as regards the ultimate elongation in the case both of unconditioned and conditioned coatings.

It is pointed out however that in the manufacture of cables it is necessary to reject mixtures in which the polyphenylsulfide content is higher than 90% in that beyond said value the ultimate elongation is lower than 50% and therefore lower than the minimum permissible value for a cable or conductor coating.

FIG. 4 shows the existence of a very marked and unpredictable synergistic effect as regards resistance to thermopressure for unconditioned coatings the development of which is represented by a continuous line.

In particular in the diagram of FIG. 4 it is possible to see that the resistance value to thermopressure is greatly and unpredictably high for coatings consisting of mixtures having a polyphenylsulfide content of about 60 parts by weight per 100 parts by weight of mixture and at all events high values of resistance to thermopressure for mixtures having a polyphenylsulfide content included between 50 and 65 parts by weight per 100 parts by weight of mixture.

The existence of such high values concerning resistance to thermopressure shows that it is possible to make cables capable of working at operating temperatures of 150° C. at least with those mixtures in which polyphenylsulfide is included between 50 and 65 parts by weight.

Checking of conductors and cables coated with mixtures of polyphenylsulfide and silicone ether imide block copolymers in order to prove that they are capable of working at operating temperatures of 150° C. has been carried out following standards MIL W 22759/18A.

For the above tests the same conductors coated with mixtures having a polyphenylsulfide content included between 50 and 65 parts by weight as those used for obtaining test pieces for cable coatings, have been employed.

The results of the tests following standards MIL W 22759/18A show that all cables having coatings made of mixtures consisting of a polyphenylsulfide (of a viscosity higher than 110 Pa per second at 310° C.) and a silicone ether imide block copolymer (having the same features as above) in which polyphenylsulfide is in an amount included between 50 and 65 parts by weight per 100 part by weight of mixture can pass the test named "SHORT-TERM THERMAL STABILITY" included in standard MIL W 22759/18A and therefore are enabled to work at operating temperatures of 150° C.

Identical tests in accordance with said standard have been carried out on cables having coatings consisting of polyphenylsulfide and silicone ether imide block copolymer mixtures having a polyphenylsulfide content included between 50 and 65 parts by weight per 100 parts by weight of mixture, in which the adopted polyphenylsulfide has a viscosity lower than or equal to 110 Pa per second at 310° C. These cables however have not passed the above test "SHORT-TERM THERMAL STABILITY" included in standard MIL W 22759/18A and therefore are unable to work at operating temperatures of 150° C.

Further experimental tests have been done in order to determine the toxicity of gases and fumes evolved from conductors and cables of the invention in the presence of a fire as well as the resistance to flame propagation.

Tests relating to toxicity of gases and fumes evolved from cables in the presence of a fire have been carried out according to standards CEI 20-37-second part, on a cable of the invention and specifically on a cable the coating of which is made of a mixture consisting of 60 parts by weight of a polyphenylsulfide and 40 parts by weight of a silicone ether imide block copolymer.

The toxicity index of gases and fumes evolved from said cable in the presence of a fire has been 16 and for any composition it has never been higher than 22.

The same experimental tests relating to toxicity of gases and fumes evolved from cables in the presence of a fire have been carried out on a known cable (capable of working at an operating temperature of 150° C. in accordance with standards MIL W 22759/18A) provided with a coating made of an ethylene tetrafluoroethylene copolymer and the toxicity index value has been 130.

Clearly the toxicity tests on gases and fumes evolved from a cable in the presence of a fire unmistakably prove that cables of the invention that are capable of working at operating temperatures even as high as 150° C., show a toxicity index greatly lower than cables having coatings made of halogenated polymers as imposed by standards MIL W 22759/18A for reaching an operating temperature of 150° C.

Tests for ascertaining the resistance to flame propagation have been carried out following standards IEC 332-2 on cables in accordance with the invention that is cables having a coating made of polyphenylsulfide and silicone ether imide block copolymer mixtures in which polyphenylsulfide is in an amount included between 15 and 90 parts by weight per 100 parts by weight of the mixture.

As stated by the above standard, a flame has been applied for a period of 20 p 1 seconds to individual lengths of cables in accordance with the invention, at a middle position, said cable lengths being rectilinear and hanging vertically from a clamp and having a length of 600±25 mm, and it has been thus ascertained that the burnt portion was more than 50 mm far from the lower edge of said clamp; therefore, as prescribed by standard IEC 332-2, all cables in accordance with the invention can pass said test.

We claim:

1. A cable comprising an electric or optical conductor and a coating layer of polymeric material extruded on said conductor wherein said coating layer comprises a mixture of a polyphenylsulfide and a silicone ether imide block copolymer in which the polyphenylsulfide has a viscosity greater than or equal to 110 Pa per second at 310° C. and is present in an amount between 15 and 90 parts by weight per 100 parts by weight of the polyphenylsulfide-silicone ether imide block copolymer mixture.

2. A cable according to claim 1 wherein the polyphenylsulfide is present in an amount between 25 and 70 parts by weight of the mixture.

3. A cable according to claim 1 wherein the polyphenylsulfide is present in an amount between 50 and 65 parts by weight of the mixture.

4. A cable according to claim 1, wherein the silicone ether imide block copolymer corresponds to the formula:

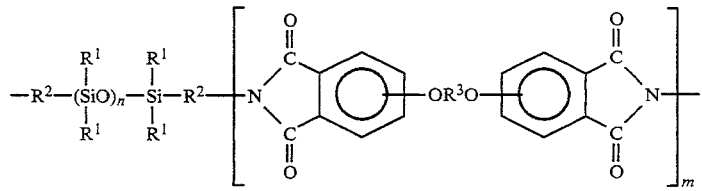

wherein:

R3 is a bivalent aromatic group having 6 to 20 carbon atoms,

R1 and R2 which may be equal or different, are selected from alkyl groups having 1 to 14 carbon atoms, n and m are numbers between 4 and 10 and 1 and 3, respectively.

5. A cable according to claim 4, wherein R1 is a methyl group, R2 is a propyl group and R3 is a bisphenol A group.

* * * * *